P. B. TAYLOR, DEC'D.
E. H. TAYLOR, EXECUTRIX.
CLUTCH.
APPLICATION FILED DEC. 17, 1918.
1,434,970.
Patented Nov. 7, 1922.
Fig. 1
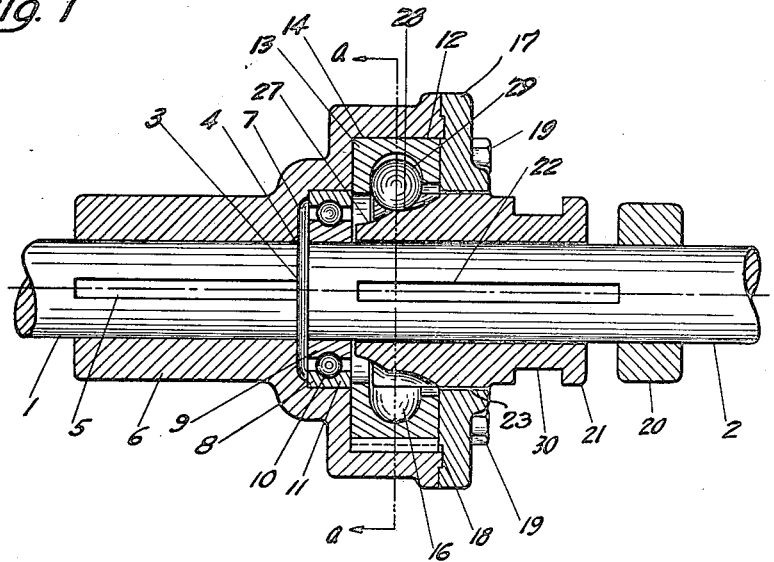
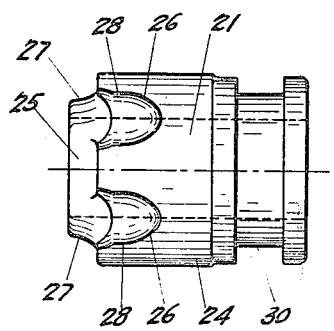
Fig. 3
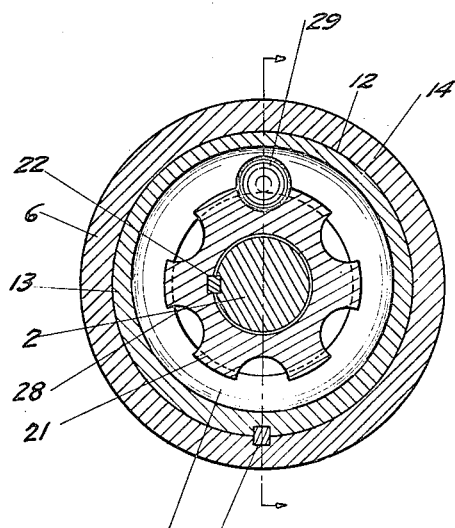
Fig. 2
INVENTOR
Percy B. Taylor
BY
Oscar S. Fult
ATTORNEY Patented Nov. 7, 1922.

1,434,970

UNITED STATES PATENT OFFICE.

PERCY B. TAYLOR, OF NEWARK, NEW JERSEY; EMMA H. TAYLOR EXECUTRIX OF SAID PERCY B. TAYLOR, DECEASED, ASSIGNOR OF ONE-HALF TO SAID EMMA H. TAYLOR AND ONE-HALF TO HERBERT BELL TAYLOR, OF WESTFIELD, NEW JERSEY.

CLUTCH.

Application filed December 17, 1918. Serial No. 267,141.

*To all whom it may concern:*

Be it known that I, PERCY B. TAYLOR, a citizen of the United States, residing in the city of Newark, county of Essex, State of New Jersey, have invented certain new and useful Improvements in Clutches, of which the following is a specification.

My invention relates to certain new and useful improvements in clutches whereby one rotating member may be connected to or disconnected from another member to cause or discontinue the rotation of the same at will, or vice versa.

It is the particular intention in the present invention to provide means for accomplishing the coupling and uncoupling of two rotating members, while the same are in relative motion to one another, with the minimum amount of wear between the parts.

One object of the invention is to provide means whereby the relative motion of the two parts will cause the same to securely lock together whereby motion may be transmitted from one to the other.

Another object is to accomplish the above purpose in such a manner that any increase of the load transmitted will automatically increase the locking effect between the parts, thereby avoiding slipping and undue wear under momentary loads which are in excess of normal.

The invention has a further object in accomplishing the above with a maximum amount of ease and freedom from shock.

A further object is to provide means whereby the coupling is automatically accomplished upon the movement of a controlling member, without the necessity of any particular skill upon the part of an operator.

Another object is to provide a clutch which may be readily thrown out of engagement while under load without the exercise of undue energy to accomplish the same.

A further object is to provide a clutch of simple and rugged construction which will have a minimum of wear and which is so constructed that parts may readily be replaced when necessary.

The above and further objects will be apparent from the accompanying specification and appended claims.

Fig. 1 is a section of the clutch taken along the axis of rotation.

Fig. 2 is a section taken through *a—a* of Fig. 1.

Fig. 3 is a side elevation of the inner member in Figs. 1 and 2.

Referring to the various figures the construction and operation of the device is as follows:—

As shown in the drawings the device discloses means for engaging two shafts which are axially in line and their ends abutting but it will be obvious that the same device may be employed for engaging other members such as a pulley wheel to a shaft or two pulley wheels together.

In the embodiment shown 1 and 2 are shafts which are axially in line and are placed with their ends 3 and 4 facing one another but with sufficient clearance to permit free relative rotation. These shafts may be supported in any kind of suitable bearings, not shown.

Shaft 1 is provided with a key-way and key 5 which is adapted to key an outer casing 6 concentrically upon the shaft 1 so that the casing 6 will rotate in unison with the shaft. The casing 6 is provided with a recess 7 in which a bearing 8 is adapted to be carried. This bearing may be of any well known type and is here shown as a ball bearing having inner race 9 adapted to rotate within a row of balls 10 carried in an outer race 11.

The inner race 9 is adapted to carry the end 4 of the shaft 2 and it will be seen that by this construction the shafts 1 and 2 are kept in alignment although they are both free to rotate independently. The casing 6 is further provided with a recess 12 in which is a case hardened steel race 13.

The race 13 is concentric with the outer case 6 at its outer surface 14 and is prevented from rotation therein by means of a key 15. On the inner surface of the race 13 a ball groove 16 is provided. This groove 16 is arranged in eccentric relation to the casing 6 and shafts 1 and 2 as will be clearly seen by reference to Fig. 2.

The recess 12 in casing 6 is closed by means of a cover 17 which is held in concentric relation to the casing 6 by means of a shoulder 18 and is clamped to casing 6 by means of bolts 19.

Shaft 2 is provided with a fixed stop collar 20 attached to the same in any suitable manner. Slidably mounted on shaft 2 is a member 21 which is prevented from relative rotation with shaft 2 by means of a key 22 along which the member 21 is adapted to slide. The cover 17 is provided with an annular opening 23 through which the shaft 2 passes and which will allow sufficient clearance about the member 21 to allow the same to be free to rotate or to move axially. This cover may be provided with a packing groove and packing about the member 21 if desirable in order to make the clutch oil tight thereby enabling the clutch to be filled with oil to take care of lubrication of the parts.

The member 21 has a cylindrical central section 24 and at its inner end 25 is provided with ball grooves 26, 27, which are formed around its circumference in parallel relation to shaft 2. These grooves are formed of two curved sections 26 and 27 respectively, the curve of 26 starting at the outer circumference and continuing to an intermediate point 28 where it is straight for a short distance and then continuing through the curve 27 to its lowest point or nearest point to the center of rotation. Six of these grooves are shown but any number may be used as only one groove is necessary for the operation of the device, the others being provided in order to substitute one groove for another in the event of excessive wear of the grooves. These grooves also serve to balance the member 21 when rotating at high speeds.

In one of these grooves 26, 27 a steel ball 29 is provided, this ball being also adapted to ride in the eccentric groove 16 in the race 13.

The outer end of the slidable member 21 is provided with an annular groove 30 in order that a collar or other device may be inserted therein to move the member 21 axially without interfering with its rotation.

In operation assuming that shaft 2 is rotating and member 21 back against collar 20, the member 21 will rotate with the shaft 2 owing to the action of key 22 and will carry around with it the ball 29 which will now be laying in part 27 of one of the grooves 26, 27. On account of the ball 29 being in part 27 of the groove the ball will be free to rotate without frictionally engaging any part of the groove 16 in the race 13. Therefore it will be seen that under these conditions the shaft 2 is free to rotate independently of the shaft 1.

If during the rotation of shaft 2 the member 21 in slid forward to the position shown in Fig. 1 the ball 29 will be caused to ride up the curved surface 27 onto the flat portion 28 of the curve 26 of the groove This will force the ball 29 outward from the center of rotation and on account of the rotation of member 21 the ball 29 will be carried around in the eccentric groove 16 of race 13 until it finally reaches a point where the surface of groove 16 converges towards the center sufficiently to jam the ball 29 between the surface 28 of the groove in member 21 and the surface of groove 16 in race 13. This will cause the ball 29 to force race 13 to rotate in unison with shaft 2 and this rotation will be transmitted back through the key 15 and casing 6 to shaft 1. It will therefore be seen that the motion of shaft 2 has effectually been transmitted to shaft 1 by means of a simple axial movement of member 21. It will further be seen that the greater the load transmitted between shafts 1 and 2 the greater will be the binding effect on the ball 29 thereby automatically taking care of the increased load.

It will be further seen that on account of the eccentricity of the groove 16 in race 13 that the clutch will automatically take up the wear of the parts thereby avoiding the necessity of repeated adjustment due to wear.

The groove 16 and the groove 26, 27 are preferably formed with the same contour as the ball. This will give the ball a line contact with both grooves instead of a point contact and will greatly increase the life of the mechanism.

In order to release the clutch all that is necessary is to withdraw the member 21 until it strikes collar 20. This will allow the ball 29 to drop into part 27 of the groove, this action being assisted by the eccentricity of groove 16 and will thereby instantly release the pressure on this ball and thereby disengage shafts 1 and 2.

It is obvious that either shaft 1 or 2 may be the driving shaft and it is further obvious that many modifications may be made in the details of construction without departing from the spirit of the invention.

What I claim is:—

1. In a clutch, an inner and outer member adapted to have relative rotation and adapted to form respectively the inner and outer walls of a deformed annular space between them, a ball in said deformed annular space, and means whereby the said ball is caused to directly engage said inner and outer walls whereby the inner and outer members are locked against relative rotation upon a relative movement of the inner and outer members parallel with their axis of rotation.

2. In a clutch mechanism, a rotatable outer member having an inner surface eccentric to its axis of rotation, an inner member adapted to rotate within the outer member upon the same axis of rotation, a clutch member in the annular space formed between the inner and outer members, and a tapering groove formed in the inner member and parallel to the axis of rotation whereby the clutch member is caused to lock the inner and outer members against relative rotation when they are in one relative position and whereby the members are released upon their assuming another relative position along the axis of rotation.

3. In a clutch mechanism, a rotatable outer member having an inner surface eccentric to its axis of rotation, an inner member adapted to rotate within the outer member upon the same axis of rotation, a ball within the annular space formed between the inner and outer members, and means whereby the ball is caused to lock the inner and outer members against relative rotation when they are in one relative position and whereby the members are released upon their assuming another relative position along the axis of rotation.

4. A clutch mechanism having in combination, an outer member adapted to be rotated and having an inner surface eccentric to its axis of rotation, an inner member adapted to rotate within the outer member upon the same axis of rotation and having a plurality of grooves formed about its circumference, a ball adapted to rest in one of said grooves and to project into the annular space between the inner and outer members, and means whereby the ball is caused to lock the inner and outer members, against relative rotation upon a relative movement of the inner and outer members parallel with their axis of rotation.

5. A clutch mechanism having in combination, an outer member adapted to be rotated and having an inner surface eccentric to its axis of rotation, an inner member adapted to rotate within the outer member upon the same axis of rotation and having a groove formed in its circumference, a ball adapted to rest in said groove and to project into the annular space between the inner and outer members and means whereby the ball is caused to frictionally engage the eccentric inner surface to transmit rotation between the inner and outer members upon a relative movement of the inner and outer members parallel with their axis of rotation.

6. In a clutch mechanism an outer member adapted to be rotated and having an inner surface eccentric to its axis of rotation, an inner member adapted to rotate within the outer member upon the same axis of rotation and having a groove of varying depth formed in its circumference in parallel relation to the axis of rotation, a clutch member adapted to rest in said groove and to project into the annular space between the inner and outer members, and means whereby the inner member is moved with relation to the outer member in a direction parallel with the axis of rotation to cause the clutching member to ride in one or the other part of said groove respectively to cause it to either engage or disengage the inner surface of the outer member to control the relative rotation of the inner and outer members.

7. In a clutch mechanism, a shaft, a member keyed to said shaft and adapted to rotate in unison with the same, a bearing in said member, a second shaft carried in said bearing, an eccentric ball race carried by said member, a slidable member on said second shaft adapted to be rotated by the same, a groove of varying depths in said slidable member, a ball adapted to rest in said groove, and means to move the slidable member into the first said member whereby the ball is forced outward from the axis of rotation to engage the eccentric ball race and transmit rotary motion from one shaft to the other.

8. In a clutch mechanism, an outer member adapted to be rotated and having an inner surface eccentric to its axis of rotation, an inner member adapted to rotate within the outer member upon the same axis of rotation and having a stepped groove formed in its circumference in parallel relation to the axis of rotation, a clutch member adapted to rest in said groove and to project into the annular space between the inner and outer members, and means whereby the inner member is moved with relation to the outer member in a direction parallel with the axis of rotation to cause the clutching member to ride in one or the other part of said groove respectively to cause it to either engage or disengage the inner surface of the outer member to control the relative rotation of the inner and outer members.

In testimony whereof, I have signed my name to this specification.

PERCY B. TAYLOR.